(12) United States Patent
Gemassmer et al.

(10) Patent No.: US 11,211,895 B2
(45) Date of Patent: Dec. 28, 2021

(54) OPERATING AN ELECTRICAL MACHINE

(71) Applicant: GKN Automotive Ltd., Birmingham (GB)

(72) Inventors: Tobias Gemassmer, Bonn (DE);
Enrique Cordero, Cologne (DE);
Florian Sontheim, Troisdorf (DE);
Rudolf Fitz, Troisdorf (DE)

(73) Assignee: GKN Automotive Ltd., Birmingham (GB)

( * ) Notice: Subject to any disclaimer, the term of this patent is extended or adjusted under 35 U.S.C. 154(b) by 0 days.

(21) Appl. No.: 17/043,748

(22) PCT Filed: May 18, 2018

(86) PCT No.: PCT/EP2018/063188
§ 371 (c)(1),
(2) Date: Sep. 30, 2020

(87) PCT Pub. No.: WO2019/219214
PCT Pub. Date: Nov. 21, 2019

(65) Prior Publication Data
US 2021/0036652 A1 Feb. 4, 2021

(51) Int. Cl.
*H02P 29/68* (2016.01)
*H02P 23/14* (2006.01)

(52) U.S. Cl.
CPC .............. *H02P 29/68* (2016.02); *H02P 23/14* (2013.01)

(58) Field of Classification Search
CPC .................................. H02P 29/68; H02P 23/14
USPC ......................................... 318/472, 471, 445
See application file for complete search history.

(56) References Cited

U.S. PATENT DOCUMENTS

2016/0226421 A1* 8/2016 Kadry .................. H02P 29/032

FOREIGN PATENT DOCUMENTS

| DE | 102007014346 A1 | 10/2008 |
| DE | 102007035825 A1 | 2/2009 |
| DE | 102013203661 A1 | 9/2014 |
| WO | 2017099655 A1 | 6/2017 |

OTHER PUBLICATIONS

International Search Report and Written Opinion for PCT/EP2018/063188 dated Jan. 29, 2019 (14 pages; with English translation).

* cited by examiner

*Primary Examiner* — David Luo
(74) *Attorney, Agent, or Firm* — Bejin Bieneman PLC

(57) ABSTRACT

A method for operating an electrical machine is used to calculate a value of a first torque which can be provided at a maximum by the electrical machine in a future interval, wherein, by limiting the torque which is provided in the interval to the value, overheating of at least one semiconductor, which is required for transmitting the electrical power, due to a power loss is prevented and/or the threat of overheating and the onset of derating is diagnosed and therefore prevented.

20 Claims, 3 Drawing Sheets

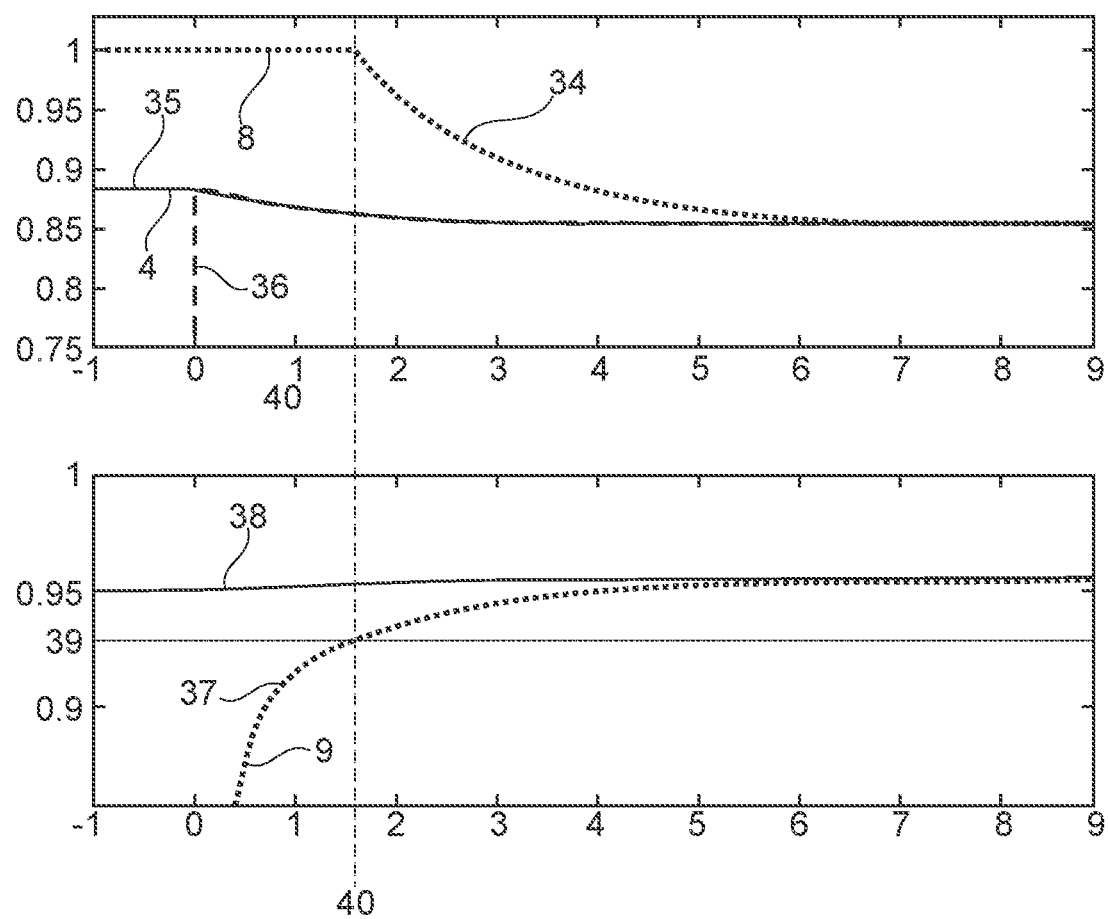
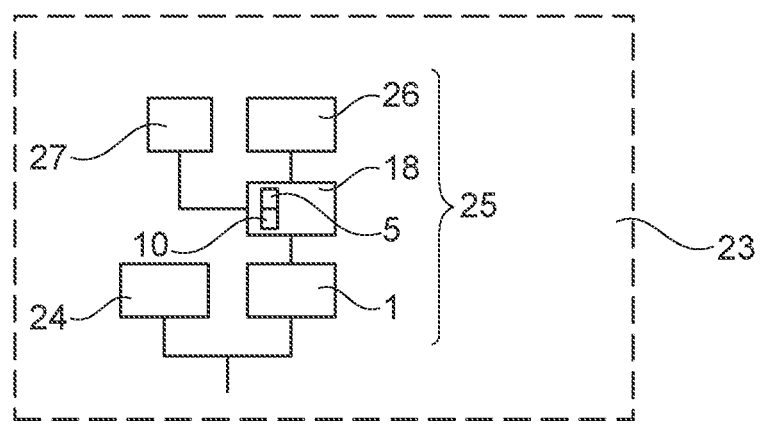
Fig. 5
Fig. 6

OPERATING AN ELECTRICAL MACHINE

CROSS-REFERENCE TO RELATED APPLICATIONS

This application is a national stage of, and claims priority to, Patent Cooperation Treaty Application No. PCT/EP2018/063188, filed on May 18, 2018, which application is hereby incorporated herein by reference in its entirety.

BACKGROUND

Electric machines that are supplied with electrical energy from inverters are regularly used in motor vehicles, e.g., as traction drives. As a result of electrical losses in the inverter, as well as of electrical and mechanical losses in the electric machine, heating of these components occurs during operation of the electric machine. In the event of a sharp rise in temperature, the heated component must be protected against thermal damage. This is done through a reduction of the electrical power transmitted to the electric machine (derating), and the associated reduction in the power loss that occurs.

To reduce the effect of the thermal derating on the operating strategy of the motor vehicle, it would be desirable to predict a possible reduction in the electrical power in advance. The power loss depends, however, on numerous factors and parameters (e.g. engine parameters, saturation properties, semiconductor properties, temperature, torque, rotation speed, intermediate circuit volt-age, regulation strategy, ageing, and so forth). The maximum thermally possible power, consisting of torque and rotation speed, can thus only be calculated with difficulty, and cannot be determined analytically.

SUMMARY

The present disclosure relates to a method for operating an electric machine, wherein the electric machine is in particular used in a motor vehicle, preferably for the drive of the motor vehicle.

The method and electric machine disclosed herein at least partially solve the problems present in the prior art. A method is provided through which a reduction in the electrical power that may possibly be required can be predicted in advance.

These objects are achieved with a method disclosed herein. Further advantageous examples of the method are given in the claims and described herein. It is to be noted that the individual features discussed in the claims can be combined with one another in a technologically reasonable manner, and define further examples of the invention. The features given in the claims are furthermore stated more precisely and explained in more detail in the description, wherein further preferred examples of the invention are presented.

A contribution is made here by a method for the operation of an electric machine wherein, through the method, a value of a maximum initial torque that can be provided by the electric machine in a future (i.e. lying in the future) (time) interval is calculated. By limiting the torque provided in the interval to this value, an overheating of at least one of the one or more semiconductors required for transmission of the electrical power resulting from a power loss (arising during the operation of the electric machine for generating this torque) is prevented (and/or a imminent overheating and the application of the derating predicted and thus prevented). The method comprises at least the following steps:

a) ascertaining electrical parameters (e.g., a rotation speed of the electric machine, an electrical voltage) with which the electric machine is being operated at a current point in time (i.e., now);

b) calculating a maximum second torque that can be generated by the electric machine at these parameters;

c) calculating an electrical power loss that would arise at the at least one semiconductor if the maximum second torque that can be generated is applied;

d) calculating a resulting first temperature of a semiconductor junction layer of the at least one semiconductor that would result from the electrical power loss present during the interval; (and, if the resulting first temperature is higher than a maximum permissible second temperature)

e) iterative performance of steps b) to d) with smaller and smaller values of the maximum second torque that can be generated according to step b) until the resulting first temperature that is calculated in accordance with step d) corresponds at most to a maximum permissible second temperature of the semiconductor junction layer; and f) then operating the electric machine in the interval with a torque whose value is at most that ascertained by the method or, if the electric machine is operated with a higher torque, shortening the interval and operating the electric machine with the higher torque (only) during the shortened interval.

A calculation of the temperature resulting for a specific operating point of the electric machine (consisting, for example, of the torque, rotation speed, and electrical voltage) can be carried out in particular with knowledge of the properties of the semiconductor being used. A control loop is therefore suggested here through which a torque is determined purely computationally, in potentially one or a plurality of iteration steps, which is then the most that can be used (after carrying out the method) for the operation of the electric machine in the (interval now beginning) (without resulting in an inadmissible overheating of the components).

The control loop models in particular steps a) to e), and at least the steps c) to e). The parameters (e.g., rotation speed and voltage) can be used as input variables for the control loop. The second torque that is possible with these parameters can also, for example, be determined by a control unit and employed as input variables for the control unit.

The second torque that is ascertained or calculated (successively where appropriate) during steps b) to e) is in particular not physically generated by the electric machine before reaching step f), but is only used for the calculation of the value then ascertained in step f). It is possible as an alternative that the second torque, which has been reduced by the difference torque, is physically generated by the electric machine (and then further reduced with the following iteration step).

The steps a) to f) are thus in particular carried out one after the other in the sequence described, if appropriate also at least partially parallel in time. The steps c) to e) are here carried out repeatedly in the sequence described, in particular after steps a) and b) have been carried out once. The step f) is then carried out after steps a) to e) (if appropriate as the conclusion) of the method.

The method itself is in particular carried out continuously during operation of the electric machine or of the motor vehicle. The method is in particular only carried out when overheating of the electric machine or of the components is to be expected.

The electrical parameters in step a) comprise, in particular, (at least or exclusively) a current rotation speed of the electric machine and a current electrical voltage that is present for the operation of the electric machine.

For carrying out step c) the control loop comprises at least one computational model, wherein the parameters (e.g., rotation speed and voltage) and the calculated second torque are used as input values. The power loss present for these input values is generated by the computational model as a result.

In the computational model, the properties of the electric machine and the components (that are necessary for provision and transmission of the electrical energy to the electric machine, for example, engine parameters, saturation properties, semiconductor properties, temperature, ageing, etc.) and a control strategy for the electric machine and the components are in particular taken into consideration.

A cooling power that is available for cooling the at least one semiconductor can be taken into consideration in step d).

The controller comprises in particular a temperature model for determination of the first temperature. In particular a mass rate of flow of coolant fluid and a coolant fluid temperature, as well as the power loss calculated in step c), can be used as input values for the temperature model.

In particular a difference between the calculated resulting first temperature and the maximum permissible second temperature is formed in step e), and a difference torque deltaT determined by a controller on the basis of this difference is confirmed. The difference torque deltaT can be subtracted in the following iteration in step b) from the (calculated) maximum second torque $T_n$ (with n=1, 2, 3, ...) that can be generated of the preceding iteration, in order to calculate a maximum second torque $T_{n+1}$ that can be generated for the immediately subsequent steps c) to d).

The controller is preferably an I-controller (integral controller) or a PI controller (proportional-integral controller).

In one example, the electric machine is operated by a multiphase (preferably three-phase) alternating current from an inverter that has a (known) switching frequency. The parameters ascertained in step a) can comprise at least one intermediate circuit voltage of the inverter as a current electrical voltage. At least the following further electrical parameters are ascertained in a step b1) that follows step b):

line current of each phase of the alternating current;
line voltage of each phase of the alternating current;
power factor and/or cos phi.

The power factor (also known as the real power factor) refers in electrical engineering in particular to the ratio of the amplitude of the real power P to the apparent power S. Cos phi is the phase shift angle between the fundamental oscillations of current and voltage. Cos phi can in particular supply more accurate values than the power factor, although a higher computing capacity may be required for this.

The control loop, in particular the control loop that is suitable for carrying out the method according to the preferred embodiment, comprises at least one computational model with a first partial model and a second partial model for carrying out step c). The parameters (e.g., rotation speed and intermediate circuit voltage) and the calculated second rotation speed are used as input values in the first partial model.

In the first partial model, the properties of the electric machine and the components (that are necessary for provision and transmission of the electrical energy to the electric machine, for example engine parameters, saturation properties, semiconductor properties, temperature, ageing, etc.) and a control strategy for the electric machine and the components are in particular taken into consideration in the computational model.

The line currents of each phase of the alternating current, the line voltage of each phase of the alternating current, and the power factor or the cos phi are found as the results of the first partial model.

The results in particular of the first partial model, as well as the parameters of intermediate circuit voltage and switching frequency, are used as input values in the second partial model. The power loss calculated according to step c) is ascertained in the second partial model on the basis of these input values.

In particular, properties (e.g., engine parameters, saturation properties, semiconductor properties, temperature, ageing, etc.), and a control strategy for the electric machine and the components (that are required for the provision and transmission of the electrical energy to the electric machine) are taken into consideration in step c).

Electrical traction drives used nowadays are, in particular, permanent-magnet synchronous machines with reluctance. This means that a desired torque cannot be uniquely assigned to an electrical current, and that the phase relationship of the current also affects the torque. The degree of freedom in the selection of current amplitude and phase relationship of the current that results from this is used in different ways in order, for example, to increase the efficiency of the electric machine, to maintain a desired control reserve, or the like.

The selection of the current amplitude and the phase relationship of the current has, in particular, a direct effect on the losses in the converter (inverter) and electric machine, for which reason it should also be taken into consideration in the determination/estimation of the temperatures.

The properties of engine parameters, saturation properties, semiconductor properties, temperature, and ageing are to be taken into consideration here, in particular in the said sequence. The engine parameters of the electric machine, including the saturation, are, for example, indispensable for determining electrical currents, electrical voltages, and cos phi as well as for ascertaining a desired torque (depending on the said control strategy). The semiconductor properties are required for the temperature model. In the simplest case they can be assumed to be linearly dependent on the phase current and the DC voltage. The semiconductor properties can be stored with any desired degree of precision and complexity: as an analytical but no longer linearly dependent function of electrical current and electrical voltage; taking semiconductor temperatures into account; taking the ageing into account; taking the variation between individual components into account; as a combination of a plurality of the said points.

In addition, as well as the control strategy, the modulation method in particular is also critical for the electrical losses, for example in terms of the difference between continuous and discontinuous methods. The type of modulation can also be taken into consideration in the thermal model, and can, however, also have an effect on the choice of current amplitude and phase relationship of the current.

The interval can, in particular, have a duration of at most 10 seconds, preferably of at most 7 seconds.

The interval can, in particular, have a duration of at least 0.5 seconds, preferably of at least 2 seconds.

The duration of the interval is in particular determined depending on an operating point of the electric machine or an operating mode, for example of the motor vehicle. The duration of the interval can in particular be varied during the operation of the electric machine. The interval can also in particular be shortened depending on the torque that is actually applied (during or immediately after the method), when the actually applied torque exceeds the value determined by the method.

The electric machine is in particular a first drive unit of a motor vehicle. If a torque requested for drive of the motor vehicle exceeds the value of the torque determined by the method according to step f) during the interval, at least one second drive unit of the motor vehicle (e.g. a combustion engine or the like) can be switched on to increase the torque provided.

The interval can in particular also be determined taking the switchable use of a further drive unit into consideration.

An electric drive arrangement is further proposed, comprising at least an electric machine and an energy source (e.g., a battery and/or an inverter that is arranged between the electric machine and the battery) as well as at least one semiconductor by way of which electrical energy of the energy source required for operation of the electric machine can be supplied. The electric drive arrangement can comprise a control unit that is appropriately implemented and/or configured to carry out the described method. The control unit can thus carry out the method, or carries it out during operation of the motor vehicle.

The control unit in particular makes use of a control loop, and/or a controller is integrated into the control unit.

The torque is only determined computationally with the control loop, in potentially one or a plurality of iteration steps, which torque is then the most that can be used (after carrying out the method) for the operation of the electric machine in the interval (now beginning, shortened if appropriate) and during the interval (without resulting in an inadmissible overheating of the components).

The control loop models in particular steps a) to e) (in particular also step b1), and at least the steps c) to e) of the method. The parameters (e.g., rotation speed and voltage, if appropriate also switching frequency, mass rate of flow of coolant fluid, and coolant fluid temperature) can be used as input variables for the control loop. The second torque that is possible with these parameters can also, for example, be determined by the control unit and employed as input variables for the control unit.

A motor vehicle is further proposed, comprising at least the electric drive arrangement, wherein the motor vehicle can (at least) be driven by means of the electric machine and the drive arrangement.

The explanations regarding the method apply equally to the drive arrangement and the motor vehicle, and vice versa.

The method can furthermore also be carried out by a computer, or by a processor of a control unit (of the vehicle).

A system for data processing is accordingly also proposed, comprising a processor that is adapted/configured in such a way that it carries out the method or a part of the steps of the proposed method.

A computer-readable storage medium can be provided comprising commands which, when executed by a computer/processor, cause this to carry out the method or at least a part of the steps of the proposed method.

The explanations regarding the method are transferable to the computer-implemented method, and vice versa.

It is to be noted as a precaution that the enumerating words used here ("first", "second", "third", . . . ) serve primarily (only) to distinguish between a plurality of similar objects, values, or processes, i.e., in particular do not necessarily specify a dependency and/or sequence of these objects, values or processes with respect to each other. Should a dependency and/or a sequence be required, it is stated here explicitly, or it emerges as being obvious to the skilled person when studying the concretely described embodiment.

BRIEF DESCRIPTION OF THE DRAWINGS

More detail is provided below with reference to the figures. It is to be noted that the invention should not be restricted by the exemplary embodiments illustrated. In particular it is also possible, unless explicitly represented otherwise, for partial aspects of the technical content explained in the figures to be extracted and to be combined with other elements and understandings from the present description. Here, schematically.

FIG. 5 shows a third illustration of the effect of the method; and

FIG. 6 shows a motor vehicle.

DETAILED DESCRIPTION

Figure 1:
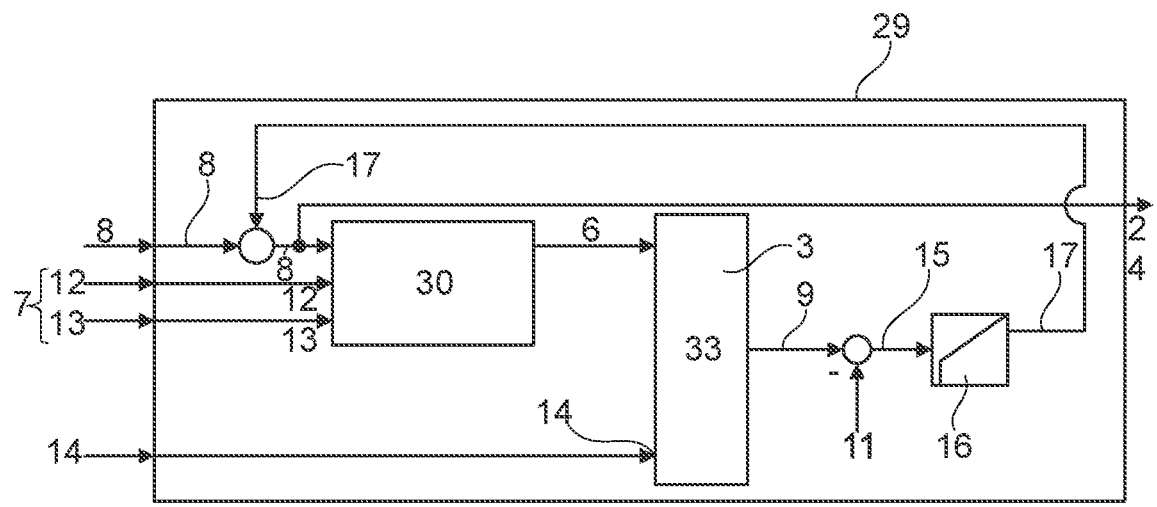
FIG. 1 shows an illustration of a first embodiment of a control loop.

FIG. 1 shows an illustration of a first example of a control loop 29. In step a), electrical parameters 7 are ascertained or read (in this case a rotation speed 12 and an electrical voltage 13), with which an electric machine 1 is being operated at a current point in time (i.e., now). In step b) a maximum second torque 8 of the electric machine 1 that can be generated at these parameters 7 is calculated, and first used as an input value. In step c), an electrical power loss 6 that would arise at at least one semiconductor 5 if the maximum second torque that can be generated is applied is calculated. The calculation takes place in a computational model 30, wherein the parameters 7 (that is to say the rotation speed 12 and voltage 13) and the calculated second torque 8 are used as input values. The power loss 6 present for these input values is generated by the computational model 30 as a result.

A resulting first temperature 9 of a semiconductor junction layer 10 of the at least one semiconductor 5 that would result from the electrical power loss 6 present during the interval 3 is calculated in step d). A cooling power 14 that is available for cooling the at least one semiconductor 5 can be taken into consideration in step d).

The control loop 29 comprises a temperature model 33 for determination of the first temperature 9. A mass rate of flow of coolant fluid and a coolant fluid temperature (summarized here as the cooling power 14), as well as the power loss 6 calculated in step c), are used as input values for the temperature model 33.

According to step e), an iterative performance of steps b) to d) is carried out with smaller and smaller values 2 of the maximum second torque 8 that can be generated according to step b) until the resulting first temperature 9 that is calculated in accordance with step d) corresponds at most to a maximum permissible second temperature 11 of the semiconductor junction layer 10.

In step e) a difference 15 between the calculated resulting first temperature 9 and the maximum permissible second temperature 11 is formed, and a difference torque 17 determined by a controller 16 on the basis of this difference 15. The difference torque 17 can be subtracted in the following iteration in step b) from the (calculated) maximum second torque 8 $T_n$ (with n=1, 2, 3, . . . ) that can be generated of the preceding iteration, in order to calculate a maximum second torque 8 $T_{n+1}$ that can be generated for the immediately subsequent steps c) to d).

If the calculated resulting first temperature 9 according to step d) corresponds at most to a maximum permissible second temperature 11 of the semiconductor junction layer 10, step f) is carried out. According to step f), an operation of the electric machine 1 in the interval 3 takes place with a torque that has at most the value 2 ascertained by the method (if relevant it is possible, if a high-level controller requests a greater torque, for the interval to then be appropriately shortened).

The second torque 8 that is ascertained or calculated (successively where appropriate) during steps b) to e) is not directly physically generated by the electric machine 1 before reaching step f), but is only used for the calculation of the value 2 then ascertained in step f).

The steps a) to f) in carried out one after the other are in the described sequence, if appropriate also at least partially parallel in time. The steps c) to e) are here carried out repeatedly in the sequence described, in particular after steps a) and b) have been carried out once. The step f) is then carried out after steps a) to e), if appropriate as the conclusion of the method.

Figure 2:
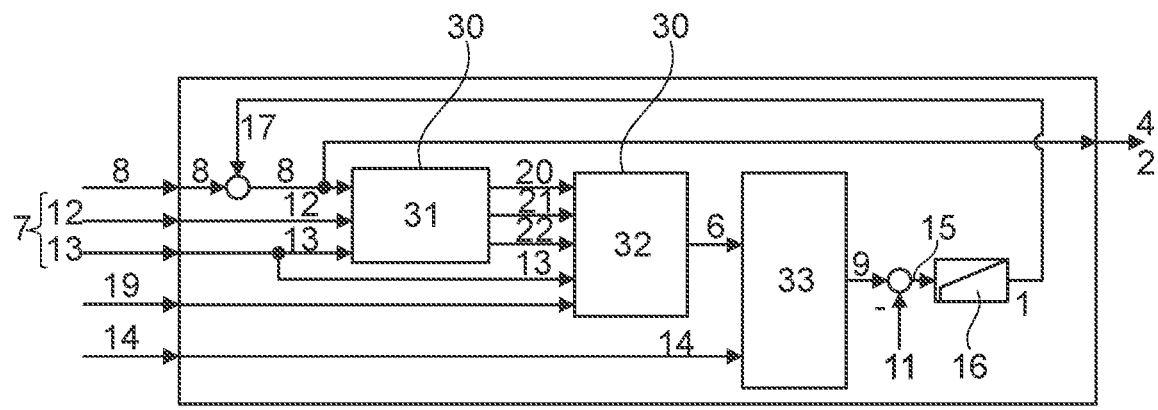
FIG. 2 shows an illustration of a second embodiment of a control loop.

FIG. 2 shows an illustration of a second example of a control loop 29. We refer to the explanations for FIG. 1. This example relates to an electric machine 1 that is operated using a multiphase (preferably three-phase) alternating current of an inverter 18 that has a (known) switching frequency 19. The parameters 7 ascertained in step a) have an intermediate circuit voltage of the inverter 18 as a current electrical voltage 13. At least the following further electrical parameters 7 are ascertained in the step b1) that follows step b):
  line current 20 of each phase of the alternating current;
  line voltage 21 of each phase of the alternating current;
  power factor 22.

The control loop 29 for carrying out the method according to the preferred embodiment comprises a computational model 30 with a first partial model 31 and a second partial model 32 for carrying out step c). The parameters 7 (rotational speed 12 and intermediate circuit voltage as the voltage 13) and the calculated second torque 8 are used as input values in the first partial model 31.

In the first partial model 31 the properties (e.g., engine parameters, saturation properties, semiconductor properties, temperature, ageing, etc.) of the electric machine 1 and the components (that are necessary for provision and transmission of the electrical energy to the electric machine 1, for example, inverter 18, semiconductor 5, etc.) as well as a control strategy for the electric machine 1 and the components are taken into consideration.

The line currents 20 of each phase of the alternating current, the line voltage 21 of each phase of the alternating current, and the power factor 22 are found as the results of the first partial model 31.

The results of the first partial model 31, as well as the parameters of intermediate circuit voltage as the voltage 13 and switching frequency 19, are used as input values in the second partial model 32. The power loss 6 calculated according to step c) is ascertained in the second partial model 32 on the basis of these input values.

Figure 3:
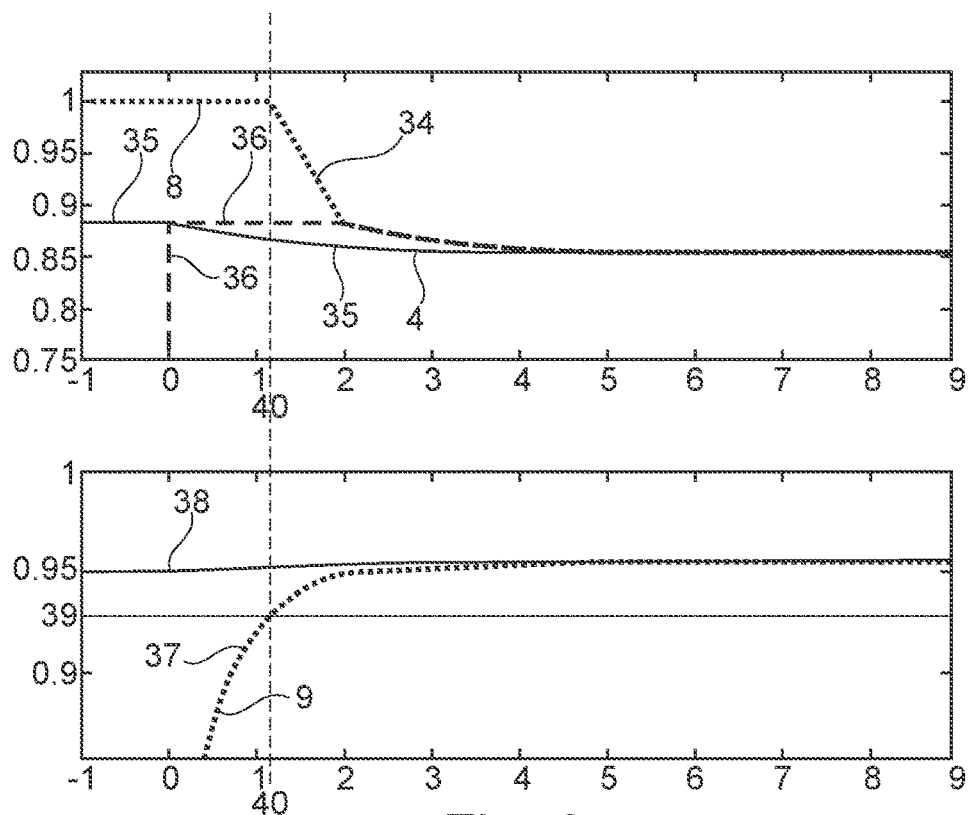
FIG. 3 shows a first illustration of the effect of the method.
Figure 4:
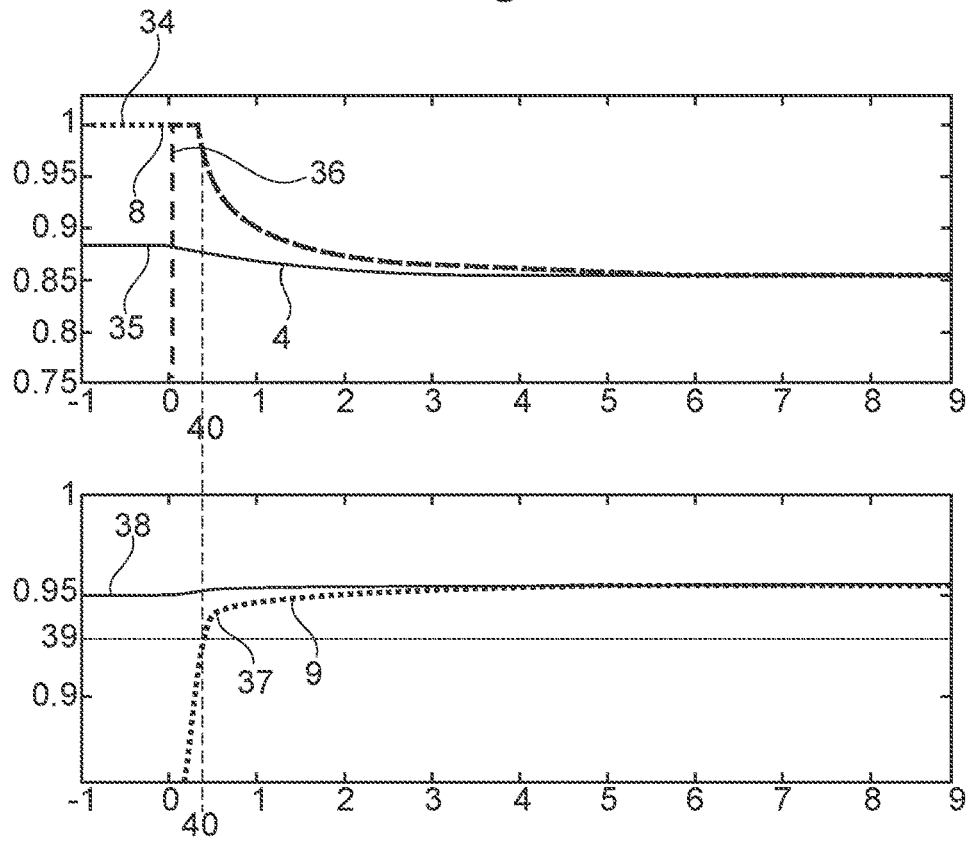
FIG. 4 shows a second illustration of the effect of the method.

FIGS. 3 to 5 show a number of illustrations of the effect of the method. The torque 4, 8 is plotted on the vertical axis in each of the upper diagrams. The torque 4, 8 is shown normalized in each case. The temperature is plotted on the vertical axis in each of the lower diagrams. The temperature is also shown normalized. The time 28 is plotted on the horizontal axis in both diagrams of each figure.

FIG. 3 shows curves of the torque 4, 8 and the temperature when the interval 3 has a length of two seconds. The maximum second torque 8 that can be generated is illustrated in the upper diagram for the currently present parameters 7 (first curve 34). The second curve 35 further shows the calculated torque with the (varying) value 2 that could be made available during an interval 3 with a length of two seconds without overheating the semiconductor 5. The third curve 36 shows the actually applied torque that, with a separation in time that corresponds to the interval (two seconds long), follows the second curve 35. In the lower diagram, the fourth curve 37 shows the (current) temperature of the semiconductor 5 or of the semiconductor junction layer 10 that results from the applied torque (according to the third curve 36). The fifth curve 38 shows the temperature of the semiconductor junction layer 10 arising when the torque according to the second curve 35 is applied, which must be maintained while taking the interval with a length of two seconds into consideration. When the current temperature according to the fourth curve 37 reaches a specified third temperature 39, a derating is introduced starting from a first time point 40, entailing a reduction of the maximum electrical power that can be supplied to the electric machine, and a reduction of the power loss associated with that (see first curve 34). The effect of the derating is that the parameters, or the electrical current or the torque, are limited, so that the maximum second torque 8 that can be generated (first curve 34) is successively reduced after the first time point 40.

The third curve 36 corresponds at any one time to at most the first curve 34. A value 2 of a maximum first torque 4 that can be provided, through which an overheating (and thereby a surprising derating) is avoided, is ascertained by the method. In this way it is ensured that the calculated resulting first temperature 9 remains underneath the maximum permissible second temperature 11 of the semiconductor junction layer 10.

FIG. 4 shows curves of the torque 4, 8 and the temperature when the interval 3 has a length of two seconds. The maximum second torque 8 that can be generated is illustrated in the upper diagram for the currently present parameters 7 (first curve 34). The second curve 35 further shows the calculated torque with the (varying) value 2 that could be made available during an interval 3 with a length of two seconds without overheating the semiconductor 5 (and without a surprisingly initiated derating). The third curve 36 shows the torque actually applied, which here has been raised to the maximum second torque 8 that can be generated. In the lower diagram, the fourth curve 37 shows the (current) temperature of the semiconductor 5 or of the semiconductor junction layer 10 that results from the applied torque (according to the third curve 36). The fifth curve 38 shows the temperature of the semiconductor junction layer 10 arising when the torque according to the second curve 35 is applied, which must be maintained while taking the interval with a length of two seconds into consideration. When the current temperature according to the fourth curve 37 reaches a specified third temperature 39, a derating is introduced starting from a first time point 40, entailing a reduction of the maximum electrical power that can be supplied to the electric machine, and a reduction of the power loss associated with that (see first curve 34). The effect of the derating is that the parameters 7, or the electrical current or the torque, are limited, so that the maximum second torque 8 that can be generated (first curve 34) is successively reduced after the first time point 40. It can be seen that the first time point 40 (start derating) occurs significantly earlier than is shown in FIGS. 3 and 5 as a result of the faster rising temperature according to the fourth curve 37.

The third curve 36 corresponds at any one time to at most the first curve 34. A value 2 of a maximum first torque 4 that can be provided, through which an overheating is avoided, is ascertained by the method. This ensures that the calculated resulting first temperature 9 (or the temperature resulting when the present torque is applied according to the third curve 36) remains below the maximum permissible second temperature 11 of the semiconductor junction layer 10.

FIG. 5 shows curves of the torque 4, 8 and the temperature when the interval 3 has a length of two seconds. The maximum second torque 8 that can be generated is illustrated in the upper diagram for the currently present parameters 7 (first curve 34). The second curve 35 further shows the calculated torque with the (varying) value 2 that could be made available during an interval 3 with a length of two seconds without overheating the semiconductor 5. The third curve 36 shows the torque that is actually applied which here directly follows the second curve 35. In the lower diagram, the fourth curve 37 shows the (current) temperature of the semiconductor 5 or of the semiconductor junction layer 10 that results from the applied torque (according to the third curve 36). The fifth curve 38 shows the temperature of the semiconductor junction layer 10 arising when the torque according to the second curve 35 is applied, which must be maintained while taking the interval with a length of two seconds into consideration. When the current temperature according to the fourth curve 37 reaches a specified third temperature 39, a derating is introduced starting from a first time point 40 entailing a reduction of the maximum electrical power that can be supplied to the electric machine, and a reduction of the power loss associated with that. The effect of the derating is that the parameters 7, or the electrical current or the torque, are limited, so that the maximum second torque 8 that can be generated (first curve 34) is successively reduced after the first time point 40. It can be seen that the derating here is initiated later in time than is illustrated in FIG. 3.

The third curve 36 corresponds at any one time to at most the first curve 34. A value 2 of a maximum first torque 4 that can be provided, through which an overheating can be avoided, is ascertained by the method. This ensures that the calculated resulting first temperature 9 (or the temperature resulting when the present torque is applied according to the third curve 36) remains below the maximum permissible second temperature 11 of the semiconductor junction layer 10.

FIG. 6 shows a motor vehicle 23. The motor vehicle 23 comprises an electric drive arrangement 25 that comprises an electric machine 1, an energy source 26 (e.g., a battery) and an inverter 18 that is arranged between the electric machine 1 and the battery, as well as a semiconductor 5. The electrical energy of the energy source 26 required for operation of the electric machine 1 can be supplied via the semiconductor 5. The electric drive arrangement 25 comprises a control unit 27 that is appropriately implemented and/or configured to carry out the described method. The motor vehicle 23 also comprises a further drive unit 24 (e.g., a combustion engine or the like) that can be switched on to increase or replace the torque provided by the electric machine 1.

LIST OF REFERENCE SIGNS

1 Machine
2 Value
3 Interval [seconds]
4 First torque [newton meters]
5 Semiconductor
6 Power loss [watts]
7 Parameters
8 Second torque [newton meters]
9 First temperature [Kelvin]
10 Semiconductor junction layer
11 Second temperature [Kelvin]
12 Rotation speed [rotations/minute]
13 Voltage [volts]
14 Cooling power [watts]
15 Difference [Kelvin]
16 Controller
17 Torque difference [newton meters]
18 Inverter
19 Switching frequency [hertz]
20 Line current [amperes]
21 Line voltage [volts]
22 Power factor
23 Motor vehicle
24 Drive unit
25 Drive arrangement
26 Energy source
27 Control unit
28 Time
29 Control loop
30 Computational model
31 First partial model
32 Second partial model
33 Temperature model
34 First curve
35 Second curve
36 Third curve
37 Fourth curve
38 Fifth curve
39 Third temperature
40 First time point

The invention claimed is:

1. A method for the operation of an electric machine comprising:
   a) ascertaining electrical parameters with which the electric machine is being operated at a current time point;
   b) calculating a maximum second torque that can be generated by the electric machine at the electrical parameters;
   c) calculating an electrical power loss that would arise at at least one semiconductor if the maximum second torque that can be generated is applied, wherein the at least one semiconductor is required for transmission of the electrical power resulting from a power loss;
   d) calculating a resulting first temperature of a semiconductor junction layer of the at least one semiconductor that would result from the electrical power loss present during a future interval;
   e) iteratively performing steps b) to d) with smaller values of the maximum second torque that can be generated according to step b) each iteration until the resulting first temperature that is calculated in accordance with step d) corresponds at most to a maximum permissible second temperature of the semiconductor junction layer; and f) then one of operating the electric machine during the future interval with a torque whose value is at most the maximum second torque ascertained by step e) or operating the electric machine with a higher torque than the maximum second torque ascertained by step e) for an interval shorter than the future interval.

2. The method of claim 1, wherein the electrical parameters in step a) comprise a current rotation speed of the electric machine and a current electrical voltage that is present for operation of the electric machine.

3. The method of claim 1, wherein calculating the resulting first temperature in step d) is based at least on a cooling power that is available for cooling the at least one semiconductor.

4. The method of claim 1, wherein a difference between the calculated resulting first temperature and the maximum permissible second temperature is formed in step e), and a difference torque is determined by a controller with reference to this difference, which is subtracted in the following iteration in step b) from the maximum second torque that can be generated of the preceding iteration in order to calculate a maximum second torque that can be generated for the immediately following steps c) to d).

5. The method of claim 4, wherein the controller is one of an I-controller or a PI-controller.

6. The method of claim 1, wherein the electric machine is operated with a multiphase alternating current of an inverter which has a switching frequency; wherein the parameters ascertained in step a) comprise at least an intermediate circuit voltage of the inverter as a current electrical voltage; the method further comprising, in a step b1) that follows step b), determining at least the following further electrical parameters: line current of each phase of the alternating current, line voltage of each phase of the alternating current, and power factor.

7. The method of claim 1, wherein calculating the electrical power loss in step c) is based at least on properties of the electric machine and a control strategy of the electric machine.

8. The method of claim 1, wherein the interval has a duration of at most 10 seconds.

9. The method of claim 1, wherein the interval has a duration of at least 0.5 seconds.

10. The method of claim 1, wherein the electric machine is a first drive unit of a motor vehicle; further comprising, when a requested torque for drive of the motor vehicle exceeds the value of the torque in the interval ascertained by the method in accordance with step f), switching on at least one second drive unit of the motor vehicle to increase the torque provided.

11. An electric drive arrangement comprising:
at least one electric machine;
an energy source;
at least one semiconductor, via which the electrical energy of the energy source can be supplied for operation of the electric machine; and
a control unit programmed to:
a) ascertain electrical parameters with which the electric machine is being operated at a current time point;
b) calculate a maximum second torque that can be generated by the electric machine at the electrical parameters;
c) calculate an electrical power loss that would arise at the at least one semiconductor if the maximum second torque that can be generated is applied;
d) calculate a resulting first temperature of a semiconductor junction layer of the at least one semiconductor that would result from the electrical power loss present during a future interval;
e) iteratively perform steps b) to d) with smaller values of the maximum second torque that can be generated according to step b) each iteration until the resulting first temperature that is calculated in accordance with step d) corresponds at most to a maximum permissible second temperature of the semiconductor junction layer; and
f) then one of operate the electric machine during the future interval with a torque whose value is at most the maximum second torque ascertained by step e) or operate the electric machine with a higher torque than the maximum second torque ascertained by step e) for an interval shorter than the future interval.

12. The electric drive arrangement of claim 11, wherein the electric machine is configured to drive a motor vehicle.

13. The electric drive arrangement of claim 11, wherein the electrical parameters in step a) comprise a current rotation speed of the electric machine and a current electrical voltage that is present for operation of the electric machine.

14. The electric drive arrangement of claim 11, wherein calculating the resulting first temperature in step d) is based at least on a cooling power that is available for cooling the at least one semiconductor.

15. The electric drive arrangement of claim 11, wherein a difference between the calculated resulting first temperature and the maximum permissible second temperature is formed in step e), and a difference torque is determined by a controller with reference to this difference, which is subtracted in the following iteration in step b) from the maximum second torque that can be generated of the preceding iteration in order to calculate a maximum second torque that can be generated for the immediately following steps c) to d).

16. The electric drive arrangement of claim 11, wherein the electric machine is operated with a multiphase alternating current of an inverter which has a switching frequency; wherein the parameters ascertained in step a) comprise at least an intermediate circuit voltage of the inverter as a current electrical voltage; wherein the control unit is further programmed to, in a step b1) that follows step b), determine at least the following further electrical parameters: line current of each phase of the alternating current, line voltage of each phase of the alternating current, and power factor.

17. The electric drive arrangement of claim 11, wherein calculating the electrical power loss in step c) is based at least on properties of the electric machine and a control strategy of the electric machine.

18. The electric drive arrangement of claim 11, wherein the interval has a duration of at most 10 seconds.

19. The electric drive arrangement of claim 11, wherein the interval has a duration of at least 0.5 seconds.

20. The electric drive arrangement of claim 11, wherein the electric machine is a first drive unit of a motor vehicle; wherein the control unit is further programmed to, when a requested torque for drive of the motor vehicle exceeds the value of the torque in the interval ascertained by the control unit in accordance with step f), switch on at least one second drive unit of the motor vehicle to increase the torque provided.

* * * * *